United States Patent [19]

Comte et al.

[11] Patent Number: 5,070,045
[45] Date of Patent: Dec. 3, 1991

[54] TRANSPARENT GLASS-CERAMIC ARTICLES

[75] Inventors: Marie J. M. Comte, Velizy; Paul L. Netter, Paris; Daniel L. G. Ricoult, Palaiseau, all of France

[73] Assignee: Corning Europe, Inc., Avon Cedex, France

[21] Appl. No.: 620,091

[22] Filed: Nov. 30, 1990

[30] Foreign Application Priority Data

Jan. 12, 1990 [FR] France .................................. 90 00326

[51] Int. Cl.$^5$ .............................................. C03L 10/14
[52] U.S. Cl. ........................................... 501/4; 501/7; 501/69
[58] Field of Search ............................ 501/4, 7, 69, 72

[56] References Cited

U.S. PATENT DOCUMENTS

| | | | |
|---|---|---|---|
| 4,415,672 | 11/1983 | Brennan et al. | 501/4 |
| 4,461,839 | 7/1984 | Rittler | 501/4 |
| 4,707,458 | 11/1987 | Chyung et al. | 501/4 |
| 4,835,121 | 5/1989 | Shibuya et al. | 501/7 X |
| 5,010,041 | 4/1991 | Koyama et al. | 501/69 X |
| 5,017,519 | 5/1991 | Morimoto et al. | 501/69 X |

Primary Examiner—Karl Group
Attorney, Agent, or Firm—C. S. Janes, Jr.

[57] ABSTRACT

This invention is principally directed to the preparation of transparent glass-ceramic articles which, when very rapidly crystallized in situ from precursor glass articles in plate form, exhibit very minimal distortion. The glass-ceramic articles contain $\beta$-quartz solid solution as the predominant crystal phase and consist essentially, in weight percent, of

| | | | |
|---|---|---|---|
| $SiO_2$ | 65–70 | $MgO + BaO + SrO$ | 1.1–2.3 |
| $Al_2O_3$ | 18–19.8 | $ZrO_2$ | 1.0–2.5 |
| $Li_2O$ | 2.5–3.8 | $As_2O_3$ | 0–1.5 |
| $MgO$ | 0.55–1.5 | $Sb_2O_3$ | 0–1.5 |
| $ZnO$ | 1.2–2.8 | $As_2O_3 + Sb_2O_3$ | 0.5–1.5 |
| $TiO_2$ | 1.8–3.2 | $Na_2O$ | 0–<1.0 |
| $BaO$ | 0–1.4 | $K_2O$ | 0–<1.0 |
| $SrO$ | 0–1.4 | $Na_2O + K_2O$ | 0–<1.0 |
| $BaO + SrO$ | 0.4–1.4 | $2.8Li_2O + 1.2ZnO/5.2MgO$ | >1.8 |

The preferred glass-ceramics contain 0.1–1.0% $V_2O_5$.

28 Claims, No Drawings

TRANSPARENT GLASS-CERAMIC ARTICLES

BACKGROUND OF THE INVENTION

The invention concerns glass-ceramic precursor glasses, a conversion process from articles made of such glasses into articles consisting of a glass-ceramic having a very low, or even zero thermal expansion, and glass-ceramic articles obtained from such glasses, especially cooktop plates.

Glass-ceramic articles have been known for about 30 years, since their invention in U.S. Pat. No. 2,920,971 (Stookey). Even though the applications for glass-ceramics are very diverse, they are particularly useful for the fabrication of cookware. Glass-ceramics are very much appreciated by the customers in part for their aesthetic appearance, but also for their physical and chemical properties. For instance, not only can their visual aspect be varied almost infinitely, but, in addition, their composition can be adjusted to make them highly resistant to acids and alkali, as well as to confer upon them a high mechanical resistance, frequently two-to-three times higher than that of glass articles of identical shape. Such a combination of properties has allowed their use as cooktop plates, in addition to their use as cookware that can be used up to much higher temperatures than classical borosilicate glasses.

It is well known that the production of glass-ceramic articles requires three major steps: melting a mixture of raw materials usually containing a nucleating agent; forming and cooling the glass below its transformation range; and crystallizing the glass article ("ceramming") by an appropriate thermal treatment. In general, this last part of the process is performed in two steps: the glass article is first heated up to a temperature slightly higher than the transformation range in order to generate the nuclei. The temperature is then increased so that crystal growth can occur on the nuclei.

On the one hand, crystalline growth being enhanced by a temperature increase, crystallization of the main crystal phase is usually performed at as high a temperature as possible to minimize the duration of the thermal treatment, and thereby the production costs. On the other hand, the article has the tendency to deform during ceramming due to thermal heterogeneities. This deformation is indeed proportional to the size of the ware, and may therefore be large in the case of cooktop plates. It is then necessary to find a compromise between optimizing the crystal growth rate and minimizing the distortion of the article. In all cases, glass composition must be adjusted so that it ensures rapid crystalline growth.

When glass-ceramic plates or sheets must be fabricated, the glass composition must also guarantee a glass viscosity compatible with the usual rolling techniques. The plates or sheets then undergo a ceram treatment such as described above.

For an application as cooktop plates, the transmission of the glass-ceramics in the visible range must be low enough to prevent dazzling of the user by the underlying heating elements (especially true when halogen lamps are used), but also high enough so that, for safety reasons, the heating element can be detected during its use by the eye. In addition, the infrared transmission must be high to optimize the efficiency of heating and cooking.

Finally, the thermal expansion coefficient of the glass-ceramic must preferably be very low to prevent breakage by thermal shock.

The present invention describes glasses having the following characteristics: (a) a viscosity required for the rolling of plates or sheets; (b) the ability to be cerammed into transparent glass-ceramics, the transmissions of which in the visible and infrared ranges can be adjusted; (c) a very low or zero thermal expansion coefficient; and (d) a minimal distortion during a very short ceram cycle (thermal crystallization treatment).

The invention also gives a process to transform a glass article of the invention into a glass-ceramic article by a thermal treatment of short duration.

Another aspect of the invention is to provide glass-ceramic articles having high transmissions in the visible and infrared ranges and a very low or zero thermal expansion coefficient, in particular heat-resistant plates (for instance, woodstove windows or fire protection windows) or cookware.

The invention also concerns articles made of a transparent glass-ceramic, presenting a low visible transmission and a high infrared transmission, and a very low or zero thermal expansion coefficient, in particular cooktop plates.

SUMMARY OF THE INVENTION

More precisely, the invention concerns thermally crystallizable glasses having a liquidus viscosity higher than 700 Pa.s characterized by their compositions, expressed in terms of weight percent of constituent oxides:

| | | | |
|---|---|---|---|
| $SiO_2$ | 65-70 | $MgO + BaO + SrO$ | 1.1-2.3 |
| $Al_2O_3$ | 18-19.8 | $ZrO_2$ | 1.0-2.5 |
| $Li_2O$ | 2.5-3.8 | $As_2O_3$ | 0-1.5 |
| $MgO$ | 0.55-1.5 | $Sb_2O_3$ | 0-1.5 |
| $ZnO$ | 1.2-2.8 | $As_2O_3 + Sb_2O_3$ | 0.5-1.5 |
| $TiO_2$ | 1.8-3.2 | $Na_2O$ | 0-<1.0 |
| $BaO$ | 0-1.4 | $K_2O$ | 0-<1.0 |
| $SrO$ | 0-1.4 | $Na_2O + K_2O$ | 0-<1.0 |
| $BaO + SrO$ | 0.4-1.4 | $2.8Li_2O + 1.2ZnO/5.2MgO$ | >1.8 |

A total of about 0.1–1.0% may be included in the above compositions of at least one colorant selected from the group consisting of $CoO$, $Cr_2O_3$, $Fe_2O_3$, $MnO_2$, $NiO$, and $V_2O_5$. When 0.1–1.0%, $V_2O_5$ is present, the sum of $TiO_2 + ZrO_2 + 5V_2O_5$ will range about 3.8–6.0%.

Particularly preferred glass compositions consist essentially of

| | | | |
|---|---|---|---|
| $SiO_2$ | 65-70 | $ZrO_2$ | 1.6-1.9 |
| $Al_2O_3$ | 18.5-19.8 | $As_2O_3$ | 0-1.5 |
| $Li_2O$ | 3.0-3.6 | $Sb_2O_3$ | 0-1.5 |
| $MgO$ | 0.8-1.25 | $As_2O_3 + Sb_2O_3$ | 0.5-1.5 |
| $ZnO$ | 1.3-2.0 | $Na_2O$ | 0-<1.0 |
| $TiO_2$ | 2.3-2.7 | $K_2O$ | 0-<1.0 |
| $BaO$ | 0-1.4 | $Na_2O + K_2O$ | 0-<1.0 |
| $SrO$ | 0-1.4 | $V_2O_5$ | 0.1-0.7 |
| $BaO + SrO$ | 0.5-1.4 | $TiO_2 + ZrO_2 + 5V_2O_5$ | 4.4-5.8 |
| $MgO + BaO + SrO$ | 1.3-2.2 | $2.8Li_2O + 1.2ZnO/5.2MgO$ | >1.8 |

The invention concerns also a process to transform an article made of such a glass into a glass-ceramic article, characterized by the fact that it comprises the following steps:

(a) the temperature of the glass article is increased at a rate of about 50°-80° C./minute up to the nucleation range of the glass;

(b) the glass article is retained within the nucleation temperature range for about 15-25 minutes;

(c) the temperature is raised to the crystallization temperature in about 15-30 minutes;

(d) the nucleated article is retained within crystalization temperature range for about 10-25 minutes; and (e) the resulting glass-ceramic article is rapidly cooled to room temperature.

Because of the essentially zero thermal expansion demonstrated by the inventive glass-ceramics, articles prepared in the laboratory could be withdrawn directly from the heat treating chamber into the ambient environment. The total duration of the ceram cycle, viz., Steps (a)-(d), is preferably on the order of one hour. Generally, the nucleation interval extends over about 670°-800° C. and the ceram temperature ranges between about 900°-960° C. The invention concerns transparent glass-ceramic articles, the visible and infrared transmissions of which being adjustable, having a linear thermal expansion coefficient of $0\pm 3\times 10^{-7}/°C.$ in the 20°-700° C. temperature range, and being characterized by the fact that they originate from the above-defined glasses and, therefore, have the same chemical composition.

Finally, the invention concerns cooktop plates made of the glass-ceramics described above, which, when produced in industrial conditions, present a distortion less than 0.1% of their diagonal dimension (the standard size for cooktop plates is 60 cm×60 cm). In order to obtain this result, we consider that the deformation of 30 cm×30 cm plates used for the development of this invention, and experimentally cerammed in a static furnace following the above-described procedure, must not exceed 2.1 mm.

Preferably, these cooktop plates have a chemical composition within the restricted range described above for the glasses of the invention. The 30 cm×30 cm glass plates of these compositions can be experimentally cerammed with a distortion less than 1.1 mm.

It should be noted that the specification set for the acceptable distortion of cooktop plates (less than 0.1% of the diagonal dimension) does not rule out the fabrication from this family of glass-ceramics of other articles for which larger distortions can be accepted, such as transparent heat-resistant glazing (woodstove windows, fire-protection doors or windows).

In addition, as already known for this glass-ceramic family, ceramming at higher temperatures than specified above, typically from 1050° to 1200° C., leads to the transformation of the transparent β-quartz solid solution crystalline phase into another silica-derived crystallization, known as β-spodumene solid solution, which confers a white opaque aspect to the material. This transformation of the transparent glass-ceramic can be used for other applications where, for aesthetic reasons or otherwise, opacity and whiteness of the material are wished. As examples of such applications, we can mention microwave oven bottom trays, cooktop plates (for instance for induction heating) or cookware. It is also possible to give the normally white opaque glass-ceramic another tint, by addition of specific colorants, such as vanadium oxide, to the base composition of the precursor glasses.

Glasses having compositions within the claimed range can be rolled and cerammed into glass-ceramic plates having the following specifications. The precursor glasses have a liquidus viscosity higher than 700 Pa.s, thereby allowing rolling into plates or sheets without devitrification defects. The glass plates can be cerammed into highly crystallized articles in less than two hours, typically in about one hour, which exhibit distortions typically less than 0.1% of the diagonal dimension of the plates. The resulting glass-ceramic is transparent. This transparency is due to the nature of the crystals, a solid solution of β-quartz, and to their size, normally less than 0.5 micrometers. The visible transmission (integrated between wavelengths 380 and 780 nm, measured for a thickness of 3 mm) of the glass-ceramic can be adjusted between about 0.01 and 88% by varying the vanadium oxide content. Finally, the glass-ceramic has a linear thermal expansion coefficient between 20° and 700° C. of $0\pm 3\times 10^{-7}/°C.$ The composition domains defined above for each component of the glass are critical for obtaining the required properties.

$Al_2O_3$ must be kept above 18% in order to guarantee the low thermal expansion coefficient of the glass-ceramic. Above 19.8% $Al_2O_3$, the liquidus viscosity becomes too low to allow rolling of plates or sheets without devitrification defects.

$Li_2O$, MgO and ZnO are essential components of the β-quartz solid solution crystalline phase. For this reason, their relative concentrations are critical to obtain the desired low thermal expansion coefficient. The addition of $Li_2O$ and ZnO induces a lowering of the thermal expansion coefficient, whereas the addition of MgO increases it. That is the reason the concentrations of these three oxides must obey the weight relationship $(2.8Li_2O+1.2ZnO)/5.2MgO > 1.8$, so that the thermal expansion coefficient of the glass-ceramic will be $0\pm 3\times 10^{-7}/°C.$ We have also observed that ZnO concentrations in excess of 2.8 wt. % or $Li_2O$ concentrations higher than 3.8 wt. % yield unacceptable values for the thermal expansion.

A $Li_2O$ concentration higher than 2.5% is needed to keep a glass viscosity compatible with classical melting techniques.

MgO has additional properties which are particularly important for the product. For instance, above 1.5 wt. % MgO, the crystallization starts occurring very suddenly and is difficult to control, resulting in breakage of the article during ceramming. However, MgO promotes the dissolution of zirconia during the initial stages of raw material melting. For this reason, a minimum concentration of 0.55% MgO is considered as being needed.

Because of its relatively large ionic radius, barium cannot enter the β-quartz lattice, but rather stays in the residual intergranular glassy phase of the glass-ceramic. BaO increases the thermal expansion of the glass-ceramic which must be compensated for by an addition of $Li_2O$ and/or ZnO, and appears to have little, if any, effect on zirconia dissolution. On the other hand, due to its presence in the intergranular glass phase, BaO contributes to lowering the glass viscosity during its ceramming, having therefore a positive contribution to the minimization of deformation.

In view of these relationships, it is preferred to maintain the barium oxide content between 0.4 and 1.4 wt. %. Furthermore, because MgO and BaO have cumulative (or concurrent) effects, their sum should not exceed 2.3%. Barium oxide may be substituted in part or totally by strontium oxide.

$TiO_2$ and $ZrO_2$ are nucleation agents. Their concentrations are critical for the final crystal size of the β-quartz phase, and therefore for the transparency of the glass-ceramic, since they determine the nuclei density in the glass.

We have also found that vanadium, in combination with $TiO_2$ and $ZrO_2$, contributes to reducing distortion during ceramming. In consequence, the sum $TiO_2 + ZrO_2 + 5V_2O_5$ must be between 3.8 and 6%. Below 3.8%, the glass-ceramic has an opal aspect, which can be ascribed to an insufficient number of nuclei, resulting in the growth of large crystals. On the other hand, the dissolution of zirconia becomes difficult above 2.5% $ZrO_2$.

The advantage of using vanadium in the products of the invention lies in the unique properties that this oxide gives to the final glass-ceramics. As a matter of fact, it makes it possible to obtain a glass-ceramic having both a low visible transmission and a high infrared transmission, a property combination which is often sought for specific applications, such as cooktop plates for instance. $V_2O_5$ gives the glass-ceramic a black aspect in reflection, and a reddish-brown tint in transmission. Although any addition of this oxide has an impact on transmission, we have found that, for applications where coloration is required, a minimum of 0.1% $V_2O_5$ and a maximum of 1% are practical limits.

Other colorants, in similar amounts, such as CoO, NiO, $Cr_2O_3$, $Fe_2O_3$, $MnO_2$, etc., can also be added to the base composition when other visible tints and/or a lower infrared transmission are desired.

$As_2O_3$ and $Sb_2O_3$ are used here as classical fining agents.

In general, $Na_2O$ and $K_2O$ are not willingly added to the composition, but come from impurities present in the raw materials. These two oxides remain located in the glassy phase, thereby contributing to the lowering of the material's viscosity during its crystallization. They also lead to an increase of the thermal expansion coefficient of the glass-ceramic.

In the composition range defined above, a restricted domain could be identified for which it was possible to obtain, by a thermal treatment lasting less than two hours, and typically about one hour, plates or sheets of glass-ceramics showing little deformation, and having the required characteristics of zero thermal expansion, transparency associated with adjustable visible transmission, and high infrared transmission. In this composition range, the distortion of 30 cm×30 cm×4 mm plates, as measured by the procedure described below, is less than 1.1 mm.

DESCRIPTION OF PREFERRED EMBODIMENTS

The following laboratory procedures have been used for the development work which led us to the present invention.

The glasses are melted at 1650° C. in large enough quantity so that 30 cm×30 cm×4 mm plates can be rolled. These plates, after being sawn to the required size, are then cerammed on ceramic grids, according to a thermal cycle of the following type:

(1) a temperature increase at a rate of 50-80 degrees/minute, up to the nucleation range, generally located close to the transformation range of the glass;

(2) a temperature increase through the nucleation range (670°-800° C.) in about 15-25 minutes;

(3) a temperature increase up to the crystallization temperature (900°-960° C.) in about 15-30 minutes;

(4) a crystallization temperature hold for 10-25 minutes; and (5) a rapid cooling to room temperature.

The exact selection of temperature and durations within the above intervals can be made for each composition through routine experimentation.

Such a thermal treatment lasts about one hour from the introduction of the article into the furnace at room temperature until the end of the crystallization plateau.

A particularly important feature of the invention is the low distortion exhibited by the plates or sheets during their ceramming. This deformation was measured during the laboratory tests. The ceramic grid placed under the plate to be cerammed was taken as the reference and the deformation reported below is the mean value of the spacing measured after ceramming between each of the four corners of the glass-ceramic plate and the underlying reference ceramic substrate. We consider that a deformation smaller than 2.1 mm, measured under the laboratory conditions, is acceptable for the fabrication of large size plates in industrial conditions. Among the typical specifications of 60 cm×60 cm cooktop plates, the distortion must not exceed 0.1% of the diagonal dimension.

The compositions of the preferred range described above guarantee that the distortion of 30 cm×30 cm×4 mm plates after ceramming in the laboratory conditions will not exceed 1.1 mm. The transposition of this low value to industrial conditions makes it possible to obtain plates with very little deformation, thereby improving the production yield.

Thermal expansion was measured with a differential dilatometer between room temperature and 700° C. Optical transmission was measured from 300 to 3000 nm on 3 mm-thick polished samples. For M.O.R. measurements (modulus of rupture) glass-ceramic disks were first polished and then abraded with a known grit paper before being fractured in a three-ball axial-load bending device. Results of experimental testing are reported in Tables 1 and 2.

In Table 1 a group of thermally crystallizable glass compositions, expressed in weight percentages of component oxides, is presented to illustrate various aspects of the present invention. It should be noted that these glasses can be melted from usual raw materials, introduced as oxides or other compounds which, by thermal decomposition, decompose into oxides in the expected amounts. For example, spodumene and barium nitrate may be used as sources of lithium and barium oxides, respectively.

The properties reported in Table 1 have been measured from glass-ceramics obtained with a thermal cycle of the type previously described.

The characteristics of the examples of Table 1 are summarized thereafter. Examples 1 and 4 contain vanadium and lead to glasses and glass-ceramics having the properties described above, Examples 1 and 2 being preferred compositions. Examples 3 and 4, although their deformation after ceram has not been quantified in the lab, show, however, the effect of titanium and zirconium oxides on the transmission of the final glass-ceramic; an addition of 0.3% $TiO_2$ and a simultaneous decrease of the same amount of $ZrO_2$ yields a decrease by 0.19 of the transmission at 700 nm (for a thickness of 3 mm) of the glass-ceramic.

Examples 5 to 7 are typical compositions from which it is possible to obtain colorless glass-ceramics. A simple comparison with the previous examples demonstrates the role played by vanadium in contributing to reduce distortion during ceramming.

Table 2 presents a selection of compositions from which glasses were melted and cerammed according to the above experimental procedure. Because these compositions are slightly outside the claimed range, they do not yield glasses and corresponding glass-ceramics having all the specifications of the invention. Like before, the compositions are given as weight percents of component oxides.

Examples 9 and 12 have too high alumina contents which lower the liquidus viscosity to values not compatible with the requirements of classical rolling technology. In this case, the devitrification phase is mullite.

Examples 10 and 11 have a too high magnesia content, leading to an excessive thermal expansion. This effect is even more important for Example 10 where the zinc concentration is also particularly low. A large deformation of the glass-ceramic corresponding to Example 10 has also been measured.

In Example 12, in addition to a high alumina concentration, the zinc oxide content is very high, which we believe accounts for the large measured deformation.

The glass-ceramic obtained from a glass of the composition Example 13 is very opalized, as a consequence of an insufficient $TiO_2$ content, which impairs the efficiency of nucleation.

Example 14 contains both a high barium oxide concentration and a low zinc oxide content. The glass-ceramic obtained from this example is highly distorted.

TABLE 1

|  | 1 | 2 | 3 | 4 | 5 | 6 | 7 | 8 |
|---|---|---|---|---|---|---|---|---|
| $SiO_2$ | 68.23 | 68.40 | 68.55 | 68.55 | 69.05 | 67.65 | 68.80 | 68.70 |
| $Al_2O_3$ | 19.05 | 18.90 | 19.00 | 19.00 | 18.90 | 18.85 | 19.10 | 19.20 |
| $Li_2O$ | 3.45 | 3.45 | 3.25 | 3.25 | 3.30 | 3.45 | 3.20 | 3.40 |
| MgO | 1.15 | 1.05 | 1.10 | 1.10 | 0.90 | 1.12 | 1.07 | 1.05 |
| ZnO | 1.62 | 1.75 | 1.55 | 1.55 | 1.55 | 1.60 | 1.50 | 1.30 |
| BaO | 0.77 | 0.85 | 0.80 | 0.80 | 0.75 | 0.90 | 0.76 | 0.80 |
| $TiO_2$ | 2.60 | 2.55 | 2.60 | 2.90 | 2.60 | 3.10 | 2.60 | 2.60 |
| $ZrO_2$ | 1.75 | 1.65 | 1.80 | 1.50 | 1.75 | 2.10 | 1.70 | 1.43 |
| $As_2O_3$ | 0.90 | 0.85 | 0.80 | 0.80 | 0.90 | 0.90 | 0.85 | 1.10 |
| $V_2O_5$ | 0.18 | 0.17 | 0.20 | 0.20 | 0.00 | 0.00 | 0.00 | 0.00 |
| $Na_2O$ | 0.12 | 0.15 | 0.15 | 0.15 | 0.20 | 0.15 | 0.19 | 0.15 |
| $K_2O$ | 0.23 | 0.23 | 0.20 | 0.20 | 0.10 | 0.18 | 0.21 | 0.25 |
| MgO + BaO | 1.92 | 1.90 | 1.90 | 1.90 | 1.65 | 2.12 | 1.83 | 1.85 |
| $\frac{(2.8\ Li_2O\ +\ 1.2\ ZnO)}{(5.2\ MgO)}$ | 2.07 | 2.15 | 1.92 | 1.92 | 2.37 | 1.99 | 1.93 | 2.03 |
| $TiO_2 + ZrO_2 + 5V_2O_5$ | 5.25 | 5.05 | 5.40 | 5.40 | 4.35 | 5.20 | 4.30 | 4.03 |
| MULLITE LIQUIDUS VISCOSITY (Pa.s) | >1000 | >1000 |  |  | 800 | 900 | >1000 | >1000 |
| THERMAL EXPANSION ($\times 10^{-7}$) | −1.80 | −1.90 | −0.30 | 0.00 | −1.00 | 1.00 | −1.50 | −2.40 |
| Transmission: |  |  |  |  |  |  |  |  |
| 700 nm | 0.24 | 0.36 | 0.41 | 0.22 | 0.89 | 0.89 | 0.89 | 0.07 |
| 1000 nm | 0.64 | 0.71 | 0.75 | 0.66 | 0.86 | 0.86 | 0.84 | 0.41 |
| 2000 nm | 0.78 | 0.80 | 0.80 | 0.80 | 0.84 | 0.85 | 0.83 | 0.76 |
| M.O.R. (MPa) | 62.00 | 70.00 | — | — | 63.00 | 62.00 | 68.00 | 60.00 |
| DEFORMATION (mm) | 0.70 | 1.05 | — | — | 1.70 | 1.80 | 1.80 | 2.00 |

TABLE 2

|  | 9 | 10 | 11 | 12 | 13 | 14 |
|---|---|---|---|---|---|---|
| $SiO_2$ | 67.40 | 68.60 | 67.96 | 64.60 | 69.50 | 66.30 |
| $Al_2O_3$ | 20.10 | 19.05 | 18.80 | 21.50 | 19.00 | 19.65 |
| $Li_2O$ | 3.30 | 2.75 | 3.50 | 3.25 | 3.25 | 3.90 |
| MgO | 1.00 | 1.95 | 1.60 | 0.75 | 1.10 | 1.00 |
| ZnO | 1.60 | 1.02 | 1.50 | 3.40 | 1.55 | 0.85 |
| BaO | 0.85 | 0.75 | 0.80 | 0.75 | 0.80 | 1.75 |
| $TiO_2$ | 2.50 | 2.55 | 2.56 | 2.55 | 1.50 | 1.30 |
| $ZrO_2$ | 1.75 | 1.60 | 1.80 | 1.65 | 1.80 | 3.05 |
| $As_2O_3$ | 0.80 | 1.08 | 0.85 | 0.85 | 0.85 | 1.72 |
| $V_2O_5$ | 0.25 | 0.25 | 0.25 | 0.25 | 0.20 | 0.00 |
| $Na_2O$ | 0.20 | 0.13 | 0.15 | 0.20 | 0.20 | 0.35 |
| $K_2O$ | 0.25 | 0.25 | 0.23 | 0.25 | 0.25 | 0.17 |
| MgO + BaO | 1.85 | 2.70 | 2.40 | 1.50 | 1.90 | 2.75 |
| $\frac{(2.8\ Li_2O\ +\ 1.2\ ZnO)}{(5.2\ MgO)}$ | 2.15 | 0.88 | 1.39 | 3.38 | 1.92 | 2.26 |
| $TiO_2 + ZrO_2 + 5V_2O_5$ | 5.25 | 5.40 | 5.61 | 5.45 | 4.30 | 4.35 |
| MULLITE LIQUIDUS VISCOSITY (Pa.s) | 500 | >1000 | 900 | 400 | >1000 | 700 |
| THERMAL EXPANSION ($\times 10^{-7}$) | 0.00 | 7.50 | 6.90 | −2.30 | 0.50 | 0.00 |
| Transmission: |  |  |  |  |  |  |
| 700 nm | — | 0.07 | 0.08 | 0.19 | — | 0.88 |
| 1000 nm | — | — | 0.42 | 0.59 | — | 0.85 |

TABLE 2-continued

|  | 9 | 10 | 11 | 12 | 13 | 14 |
|---|---|---|---|---|---|---|
| 2000 nm | — | — | 0.79 | 0.79 | — | 0.85 |
| M.O.R. (MPa) | — | 62.00 | 45.00 | 57.00 | — | — |
| DEFORMATION (mm) | — | 2.50 | 2.20 | 3.30 | — | 3.80 |

We claim:

1. A thermally crystallizable glass exhibiting a liquidus viscosity greater than 700 Pa.s which can be thermally crystallized in situ to a transparent glass-ceramic article demonstrating a linear coefficient of thermal expansion (20°–700° C.) of $0 \pm 3 \times 10^{-7}/°C.$, containing $\beta$-quartz solid solution as the predominant crystal phase, and capable of being crystallized in situ to a plate form exhibiting a distortion of less than 0.1% of its diagonal dimension when subjected to a very short thermal crystallization treatment, said glass consisting essentially, expressed in terms of weight percent on the oxide basis, of

| $SiO_2$ | 65–70 | $MgO + BaO + SrO$ | 1.1–2.3 |
|---|---|---|---|
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $2.8Li_2O + 1.2ZnO/5.2MgO$ | >1.8 |

2. A thermally crystallizable glass according to claim 1 also containing 0.1–1.0% total of at least one colorant selected from the group consisting of CoO, $Cr_2O_3$, $Fe_2O_3$, $MnO_2$, NiO, and $V_2O_5$.

3. A thermally crystallizable glass according to claim 2 containing 0.1–1.0% $V_2O_5$ wherein $TiO_2 + ZrO_2 + 5\text{-}V_2O_5 = 3.8\text{--}6.0\%$.

4. A thermally crystallizable glass according to claim 3 consisting essentially of

| $SiO_2$ | 65–70 | $ZrO_2$ | 1.6–1.9 |
|---|---|---|---|
| $Al_2O_3$ | 18.5–19.8 | $As_2O_3$ | 0–1.5 |
| $Li_2O$ | 3.0–3.6 | $Sb_2O_3$ | 0–1.5 |
| MgO | 0.8–1.25 | $As_2O_3 + Sb_2O_3$ | 0.5–1.5 |
| ZnO | 1.3–2.0 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.5–1.4 | $V_2O_5$ | 0.1–0.7 |
| MgO + BaO + SrO | 1.3–2.2 | $TiO_2 + ZrO_2 + 5V_2O_5$ | 4.4–5.8 |
| $TiO_2$ | 2.3–2.7 | $2.8Li_2O + 1.2ZnO/5.2MgO$ | >1.8 |

5. A transparent glass-ceramic article demonstrating a linear coefficient of thermal expansion (20°–700° C.) of $0 \pm 3 \times 10^{-7}/°C.$, containing $\beta$-quartz solid solution as the predominant crystal phase, and exhibiting in plate form a distortion of less than 0.1% of its diagonal dimension when crystallized in situ by means of a very short thermal crystallization heat treatment from a thermally crystallizable glass consisting essentially, expressed in terms of weight percent on the oxide basis, of

| $SiO_2$ | 65–70 | $MgO + BaO + SrO$ | 1.1–2.3 |
|---|---|---|---|
| $Al_2O_3$ | 18–19.8 | $ZrO_2$ | 1.0–2.5 |
| $Li_2O$ | 2.5–3.8 | $As_2O_3$ | 0–1.5 |
| MgO | 0.55–1.5 | $Sb_2O_3$ | 0–1.5 |
| ZnO | 1.2–2.8 | $As_2O_3 + Sb_2O_3$ | 0.5–1.5 |
| $TiO_2$ | 1.8–3.2 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.4–1.4 | $2.8Li_2O + 1.2ZnO/5.2MgO$ | >1.8 |

6. A glass-ceramic article according to claim 5 also containing 0.1–1.0% total of at least one colorant selected from the group consisting of CoO, $Cr_2O_3$, $Fe_2O_3$, $MnO_2$, NiO, and $V_2O_5$.

7. A thermally crystallizable glass according to claim 6 containing 0.1–1.0% $V_2O_5$ wherein $TiO_2 + ZrO_2 + 5\text{-}V_2O_5 = 3.8\text{--}6.0\%$.

8. A glass-ceramic article according to claim 6 wherein the visible transmission (integrated between wavelengths 380 and 780 nm measured for a thickness of 3 mm) varies between about 0.01–88%.

9. A glass-ceramic article according to claim 7 wherein the visible transmission (integrated between wavelengths 380 and 780 nm measured for a thickness of 3 mm) varies between about 0.01–88%.

10. A glass-ceramic article according to claim 7 consisting essentially of

| $SiO_2$ | 65–70 | $ZrO_2$ | 1.6–1.9 |
|---|---|---|---|
| $Al_2O_3$ | 18.5–19.8 | $As_2O_3$ | 0–1.5 |
| $Li_2O$ | 3.0–3.6 | $Sb_2O_3$ | 0–1.5 |
| MgO | 0.8–1.25 | $As_2O_3 + Sb_2O_3$ | 0.5–1.5 |
| ZnO | 1.3–2.0 | $Na_2O$ | 0–<1.0 |
| BaO | 0–1.4 | $K_2O$ | 0–<1.0 |
| SrO | 0–1.4 | $Na_2O + K_2O$ | 0–<1.0 |
| BaO + SrO | 0.5–1.4 | $V_2O_5$ | 0.1–0.7 |
| MgO + BaO + SrO | 1.3–2.2 | $TiO_2 + ZrO_2 + 5V_2O_5$ | 4.4–5.8 |
| $TiO_2$ | 2.3–2.7 | $2.8Li_2O + 1.2ZnO/5.2MgO$ | >1.8 |

11. A glass-ceramic article according to claim 10 wherein the visible transmission (integrated between wavelengths 380 and 780 nm measured for a thickness of 3 mm) varies between about 0.01–88%.

12. A glass-ceramic article according to claim 7 being in the form selected from the group consisting of a cooktop plate, a cookware, a microwave oven bottom tray, a woodstove window, a fire protection door, and a fire protection window.

13. A glass-ceramic article according to claim 10 being in the form selected from the group consisting of a cooktop plate, a cookware, a microwave oven bottom tray, a woodstove window, a fire protection door, and a fire protection window.

14. A white opaque glass-ceramic article containing $\beta$-spodumene solid solution as the predominant crystal phase which in plate form exhibits a distortion of less than 0.1% of its diagonal dimension when crystallized in situ by means of a very short thermal crystallization heat treatment from a thermally crystallizable glass consisting essentially, expressed in terms of weight percent on the oxide basis, of

| | | | |
|---|---|---|---|
| SiO$_2$ | 65-70 | MgO + BaO + SrO | 1.1-2.3 |
| Al$_2$O$_3$ | 18-19.8 | ZrO$_2$ | 1.0-2.5 |
| Li$_2$O | 2.5-3.8 | As$_2$O$_3$ | 0-1.5 |
| MgO | 0.55-1.5 | Sb$_2$O$_3$ | 0-1.5 |
| ZnO | 1.2-2.8 | As$_2$O$_3$ + Sb$_2$O$_3$ | 0.5-1.5 |
| TiO$_2$ | 1.8-3.2 | Na$_2$O | 0-<1.0 |
| BaO | 0-1.4 | K$_2$O | 0-<1.0 |
| SrO | 0-1.4 | Na$_2$O + K$_2$O | 0-<1.0 |
| BaO + SrO | 0.4-1.4 | 2.8Li$_2$O + 1.2ZnO/5.2MgO | >1.8 |

15. A white opaque glass-ceramic article according to claim 14 being in the form selected from the group consisting of a cooktop plate, a cookware, a microwave bottom tray, and a fire protection door.

16. A tinted opaque glass-ceramic article having the composition according to claim 14 also containing 0.1-1.0% total of at least one colorant selected from the group consisting of CoO, Cr$_2$O$_3$, Fe$_2$O$_3$, MnO$_2$, NiO, and V$_2$O$_5$.

17. A tinted opaque glass-ceramic article according to claim 16 containing 0.1-1.0% V$_2$O$_5$ wherein TiO$_2$+ZrO$_2$+5V$_2$O$_5$=3.8-6.0%.

18. A tinted opaque glass-ceramic article according to claim 17 consisting essentially of

| | | | |
|---|---|---|---|
| SiO$_2$ | 65-70 | ZrO | 1.6-1.9 |
| Al$_2$O$_3$ | 18.5-19.8 | As$_2$O$_3$ | 0-1.5 |
| Li$_2$O | 3.0-3.6 | Sb$_2$O$_3$ | 0-1.5 |
| MgO | 0.8-1.25 | As$_2$O$_3$ + Sb$_2$O$_3$ | 0.5-1.5 |
| ZnO | 1.3-2.0 | Na$_2$O | 0-<1.0 |
| BaO | 0-1.4 | K$_2$O | 0-<1.0 |
| SrO | 0-1.4 | Na$_2$ + K$_2$O | 0-<1.0 |
| BaO + SrO | 0.5-1.4 | V$_2$O$_5$ | 0.1-0.7 |
| MgO + BaO + SrO | 1.3-2.2 | TiO$_2$ + ZrO$_2$ + 5V$_2$O$_5$ | 4.4-5.8 |
| TiO$_2$ | 2.3-2.7 | 2.8Li$_2$O + 1.2ZnO/5.2MgO | >1.8 |

19. A tinted opaque glass-ceramic article according to claim 17 being in the form selected from the group consisting of a cooktop plate, a cookware, a microwave oven bottom tray, and a fire protection door.

20. A tinted opaque glass-ceramic article according to claim 18 being in the form selected from the group consisting of a cooktop plate, a cookware, a microwave oven bottom tray, and a fire protection door.

21. A method for making a transparent glass-ceramic article demonstrating a linear coefficient of thermal expansion (20°-700° C.) of 0±3×10$^{-7}$/°C., containing β-quartz solid solution as the predominant crystal phase, and, when in plate form, exhibiting a distortion less than 0.1% of its diagonal dimension consisting essentially of the steps:

(a) melting a batch for a glass consisting essentially, expressed in terms of weight percent on the oxide basis, of

| | | | |
|---|---|---|---|
| SiO$_2$ | 65-70 | MgO + BaO + SrO | 1.1-2.3 |
| Al$_2$O$_3$ | 18-19.8 | ZrO$_2$ | 1.0-2.5 |
| Li$_2$O | 2.5-3.8 | As$_2$O$_3$ | 0-1.5 |
| MgO | 0.55-1.5 | Sb$_2$O$_3$ | 0-1.5 |
| ZnO | 1.2-2.8 | As$_2$O$_3$ + Sb$_2$O$_3$ | 0.5-1.5 |
| TiO$_2$ | 1.8-3.2 | Na$_2$O | 0-<1.0 |
| BaO | 0-1.4 | K$_2$O | 0-<1.0 |
| SrO | 0-1.4 | Na$_2$O + K$_2$O | 0-<1.0 |
| BaO + SrO | 0.4-1.4 | 2.8Li$_2$O + 1.2ZnO/5.2MgO | >1.8 |

(b) cooling said melt to a temperature below the transformation range thereof and simultaneously forming a glass article of a desired configuration therefrom;

(c) raising the temperature of said glass article at a rate of about 50°-80° C./minute to the temperature range of about 670°-800° C.;

(d) retaining said glass article within the temperature range of about 670°-800° C. for about 15-25 minutes to develop nuclei therein;

(e) raising the temperature of said nucleated glass article at a rate sufficient to bring said glass article within the temperature range of about 900°-960° C. in about 15-30 minutes;

(f) retaining said nucleated glass article within the temperature range of about 900°-960° C. or about 10-25 minutes to grow β-quartz solid solution crystals on said nuclei; and thereafter (g) rapidly cooling said crystallized article to room temperature.

22. A method according to claim 21 wherein said glass also contains 0.1-1.0% total of at least one colorant selected from the group consisting of CoO, Cr$_2$O$_3$, Fe$_2$O$_3$, MnO$_2$, NiO, and V$_2$O$_5$.

23. A method according to claim 22 wherein said glass contains 0.1-1.0% V$_2$O$_5$ wherein TiO$_2$+ZrO$_2$+5V$_2$O$_5$=3.8-6.0%.

24. A method according to claim 21 wherein said glass consists essentially of

| | | | |
|---|---|---|---|
| SiO$_2$ | 65-70 | ZrO$_2$ | 1.6-1.9 |
| Al$_2$O$_3$ | 18.5-19.8 | As$_2$O$_3$ | 0-1.5 |
| Li$_2$O | 3.0-3.6 | Sb$_2$O$_3$ | 0-1.5 |
| MgO | 0.8-1.25 | As$_2$O$_3$ + Sb$_2$O$_3$ | 0.5-1.5 |
| ZnO | 1.3-2.0 | Na$_2$O | 0-<1.0 |
| BaO | 0-1.4 | K$_2$O | 0-<1.0 |
| SrO | 0-1.4 | Na$_2$O + K$_2$O | 0-<1.0 |
| BaO + SrO | 0.5-1.4 | V$_2$O$_5$ | 0.1-0.7 |
| MgO + BaO + SrO | 1.3-2.2 | TiO$_2$ + ZrO$_2$ + 5V$_2$O$_5$ | 4.4-5.8 |
| TiO$_2$ | 2.3-2.7 | 2.8Li$_2$O + 1.2ZnO/5.2MgO | >1.8 |

25. A method according to claim 21 wherein the total duration of time required to carry out the processes of paragraphs (b)-(f) will not exceed about two hours.

26. A method according to claim 25 wherein said duration of time is about one hour.

27. A method according to claim 24 wherein the total duration of time required to carry out the processes of paragraphs (b)-(f) will not exceed about two hours.

28. A method according to claim 27 wherein said duration of time is about one hour.

* * * * *